United States Patent
Kushwaha et al.

(10) Patent No.: US 9,141,412 B2
(45) Date of Patent: Sep. 22, 2015

(54) TERMINAL SERVICES APPLICATION VIRTUALIZATION FOR COMPATIBILITY

(75) Inventors: Anubhav Kushwaha, Hyderabad (IN); Arvind Kandhare, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 710 days.

(21) Appl. No.: 12/485,286

(22) Filed: Jun. 16, 2009

(65) Prior Publication Data

US 2010/0318992 A1  Dec. 16, 2010

(51) Int. Cl.
*G06F 9/455* (2006.01)
*G06F 15/16* (2006.01)

(52) U.S. Cl.
CPC ........................................ *G06F 9/455* (2013.01)

(58) Field of Classification Search
None
See application file for complete search history.

(56) References Cited

U.S. PATENT DOCUMENTS

| | | | | |
|---|---|---|---|---|
| 7,117,495 B2 * | 10/2006 | Blaser et al. | ................... | 717/174 |
| 7,533,349 B2 * | 5/2009 | Saul et al. | ...................... | 715/769 |
| 7,590,743 B2 * | 9/2009 | Willis | ........................... | 709/227 |
| 7,941,801 B2 * | 5/2011 | Williams et al. | .................. | 718/1 |
| 7,984,192 B2 * | 7/2011 | Burr et al. | ...................... | 709/250 |
| 8,005,962 B2 * | 8/2011 | Song et al. | ..................... | 709/227 |
| 8,302,108 B1 * | 10/2012 | Hurren et al. | ................. | 719/320 |
| 2002/0066021 A1 | 5/2002 | Chien | | |
| 2005/0076326 A1 * | 4/2005 | McMillan et al. | ............ | 717/100 |
| 2006/0090136 A1 | 4/2006 | Miller | | |
| 2007/0094667 A1 | 4/2007 | Bissett | | |
| 2007/0162510 A1 * | 7/2007 | Lenzmeier et al. | ........... | 707/200 |
| 2007/0171921 A1 | 7/2007 | Wookey | | |
| 2007/0180448 A1 * | 8/2007 | Low et al. | .......................... | 718/1 |
| 2007/0180450 A1 * | 8/2007 | Croft et al. | ........................ | 718/1 |
| 2007/0244967 A1 * | 10/2007 | Ben-Shachar et al. | ........ | 709/204 |
| 2008/0005694 A1 * | 1/2008 | Abdo et al. | .................... | 715/794 |
| 2008/0034071 A1 | 2/2008 | Wilkinson | | |
| 2009/0106780 A1 * | 4/2009 | Nord et al. | ..................... | 719/329 |
| 2009/0113424 A1 * | 4/2009 | Chen et al. | ........................ | 718/1 |
| 2009/0113425 A1 * | 4/2009 | Ports et al. | ......................... | 718/1 |
| 2010/0223443 A1 * | 9/2010 | Brjazovski et al. | ........... | 711/168 |
| 2010/0281479 A1 * | 11/2010 | Larkin et al. | ...................... | 718/1 |
| 2011/0231844 A1 * | 9/2011 | Ben-Shaul et al. | ............... | 718/1 |
| 2012/0124573 A1 * | 5/2012 | Mamtani et al. | .................. | 718/1 |

OTHER PUBLICATIONS

Purcell et al., "IBM Dynamic Application Virtualization," alphaworks.ibm.com/tech/dav, Sep. 27, 2007, pp. 1-3.
"Microsoft Application Virtualization for Terminal Services," Microsoft Corporation, microsoft.com/systemcenter/appv/terminalsvcs.mspx, © 2009, pp. 1-2.

(Continued)

*Primary Examiner* — Tammy Lee
(74) *Attorney, Agent, or Firm* — Kate Drakos; Henry Gabryjelski; Micky Minhas (57) ABSTRACT

Systems, methods and computer-readable storage media are disclosed for providing a virtual single-user session to a client in a terminal server session. In an embodiment, requests to a resource in the system-space of a system made by an application are intercepted. A determination is made as to whether to virtualize the resource for the application. Where the resource is to be virtualized, a user-specific virtualized resource is created or maintained in user-space and provided to the application.

20 Claims, 4 Drawing Sheets

(56) References Cited

OTHER PUBLICATIONS

Train et al., "NetFS: Networking through the File System," isi.edu/~touch/pubs/isi-tr-2003-579/isi-tr-2003-579.pdf, downloaded 2009, 10 pages.

"Can Terminal Services be considered Virtualization?" General Virtualization Articles, virtualizationadmin.com/articles-tutorials/general-virtualization-articles/terminal-services-considered-virtualization.html, Sep. 24, 2008, pp. 1-3.

* cited by examiner

TERMINAL SERVICES APPLICATION VIRTUALIZATION FOR COMPATIBILITY

BACKGROUND OF THE INVENTION

A terminal server is a specialized computing system that aggregates multiple communication channels. One or more clients (or "thin clients") may engage in bidirectional communication with the terminal server in a terminal server session. In such a session, applications are executed using server resources and images and sound corresponding to the output of those executing applications are sent to the client for local presentation. In this way, one using the client computer gets the experience that the applications are executing locally on the client machine, while the processing occurs on the server.

Many computing applications written without thought to a terminal server context may run without modification on a terminal server, which executes an instance of an application for each client session that wishes to execute it. However, there do exist compatibility issues with some applications that were originally designed to run on a single desktop machine.

This may be due to characteristics of the terminal server environment that differentiate it from a single-user environment. For example, a terminal server environment is a multi-user environment and an application may be accessed simultaneously by a plurality of users. Further, a user on a client may be a non-privileged user on the terminal server.

As such, some applications face issues that interfere with proper execution, such as unexpected sharing of data, corruption of data through simultaneous access by a plurality of application instances, inability to use more than one instance of an application, and requiring privileged user credentials to access system files or settings. Such an application may be designed to expect that only one instance of it executes on a computing device (for instance, that it writes to C:\Data\application.txt and that no other instance of the application will be present to simultaneously write there), that it has exclusive use of a file system, that it will run with administrator privileges.

SUMMARY OF THE INVENTION

It would therefore be an improvement to modify a terminal server environment to provide virtual single-user system to every client's instance of an application. For instance, in conjunction with an executing MICROSOFT WINDOWS™ operating system, this may comprise a file system, registry and named objects presented like for a single-user computing environment.

This virtual single-user system may be effectuated by using a combination of filter drivers and application programming interface (API) shims to create a virtualized system (file system, registry and/or named objects) that is driven by a configuration layer. The filter drivers query the configuration layer for paths to redirect to the virtual system and the configuration layer uses a user-driven configuration of virtualization depending on the application being used.

Such an environment allows the following scenarios to occur on a terminal server for applications that are incompatible with prior art terminal server implementations: (1) multiple users writing to the same file, registry, or named object entry. Since every user has a virtual store to which calls to these resources get redirected, these calls do not result in unexpected data access or corruption. (2) Write operations to a protected file, registry or named object may be done by a non-privileged user by creating a virtual copy of the system and allowing the user to write to that resource without affecting the actual system state, and allowing applications to execute as if they are running in a single-user environment with administrator privileges. (3) An administrator is able to configure which applications are incompatible and need a virtualized environment through a simple user interface.

Such an environment would improve the baseline compatibility of a terminal server for legacy or older applications, reduce the cost of migrating to a terminal server environment, and reduce the support needs of end users. Further, the present techniques allow for a virtual single-user system to be provided without modification to applications that run on the system. Additionally, several virtual-single user sessions may execute on the terminal server simultaneously. This enables a single terminal server to provide multiple virtual single-user system for enforcing compatibility with legacy applications that require a single-user environment.

BRIEF DESCRIPTION OF THE DRAWINGS

The systems, methods, and computer readable media for providing a virtual single-user session to a client in a terminal server session, in accordance with this specification, are further described with reference to the accompanying drawings in which.

DETAILED DESCRIPTION OF ILLUSTRATIVE EMBODIMENTS

Figure 1:
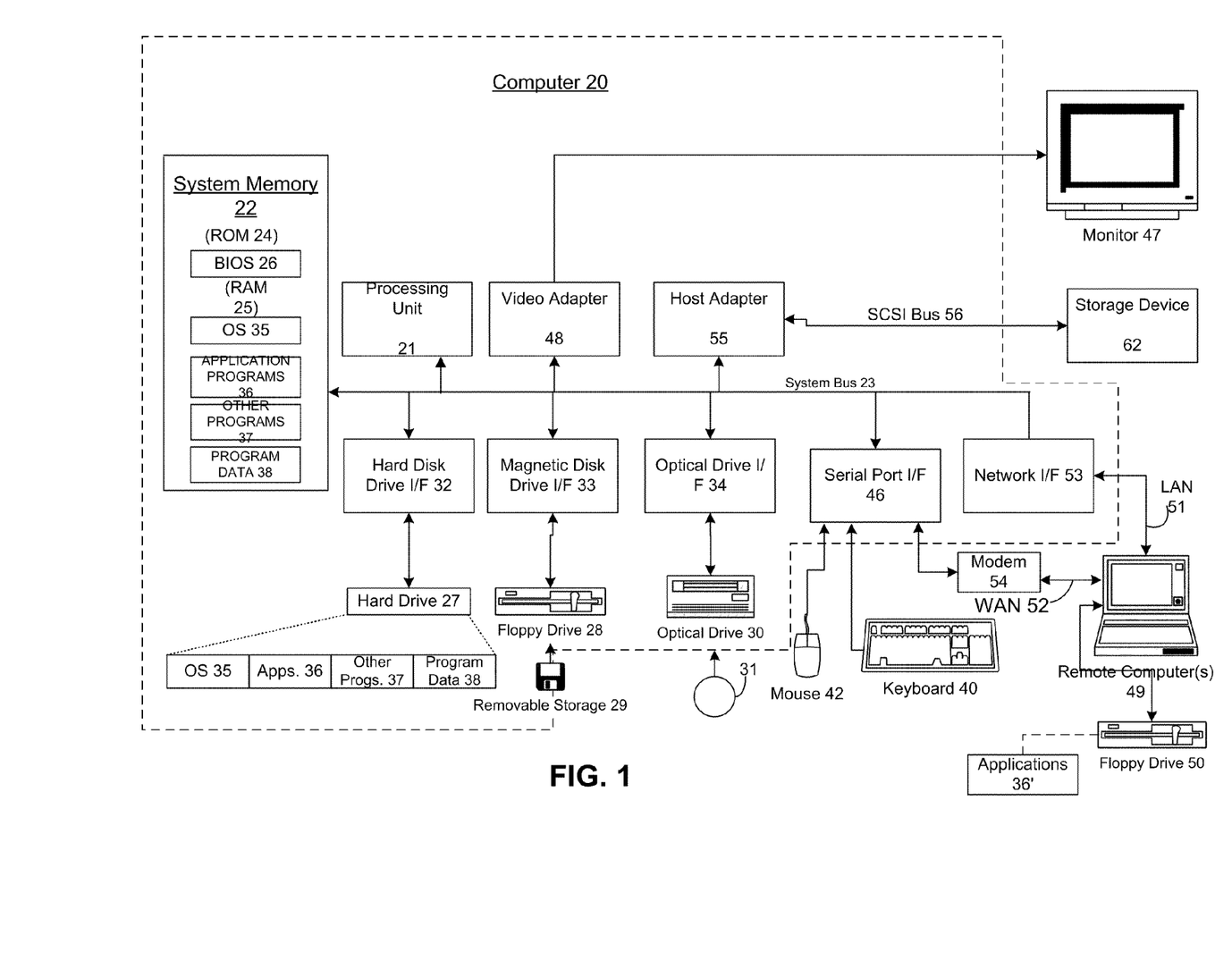
FIG. 1 illustrates an example computing environment in which the present techniques may be practiced.

Numerous embodiments of the present disclosure may execute on a computer. FIG. 1 and the following discussion is intended to provide a brief general description of a suitable computing environment in which the disclosure may be implemented. One skilled in the art can appreciate that the computer system of FIG. 1 can in some embodiments effectuate the server 204 of FIGS. 2 and 3. In these example embodiments, the server 204 and client 201 can include some or all of the components described in FIG. 1 and in some embodiments the server 204 and client 201 can include circuitry configured to instantiate specific aspects of the present disclosure. For example, the term circuitry used through the disclosure can include specialized hardware components configured to perform function(s) by firmware or switches. In other example embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Referring now to FIG. 1, an exemplary general purpose computing system is depicted. The general purpose computing system can include a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments computer executable instructions embodying aspects of the present disclosure may be stored in ROM 24, hard disk (not shown), RAM 25, removable magnetic disk 29, optical disk 31, and/or a cache of processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically can include many or all of the elements described above relative to the personal computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the personal computer 20 can be connected to the LAN 51 through a network interface or adapter 53. When used in a WAN networking environment, the personal computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
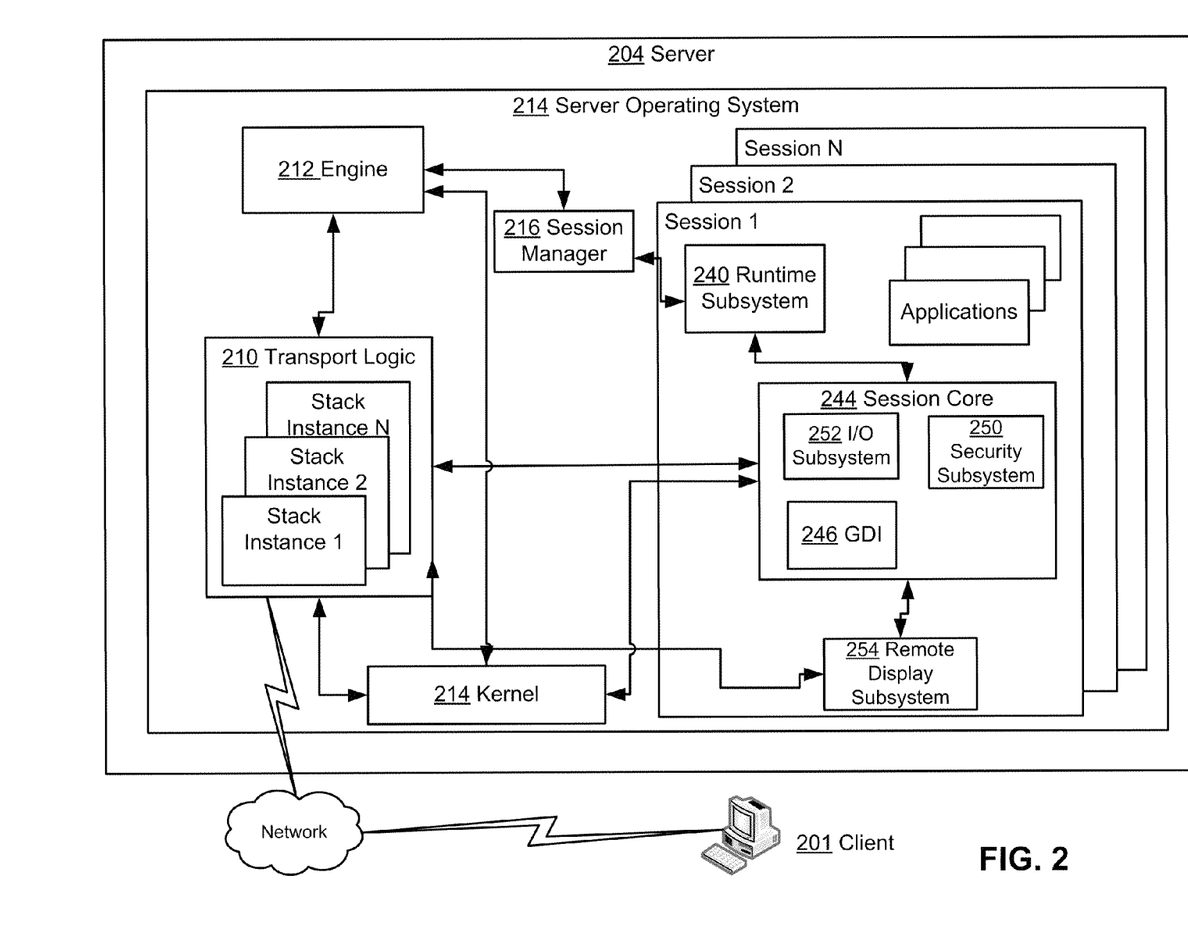
FIG. 2 illustrates an example terminal server architecture that may execute in the computing environment of FIG. 1.
Figure 3:
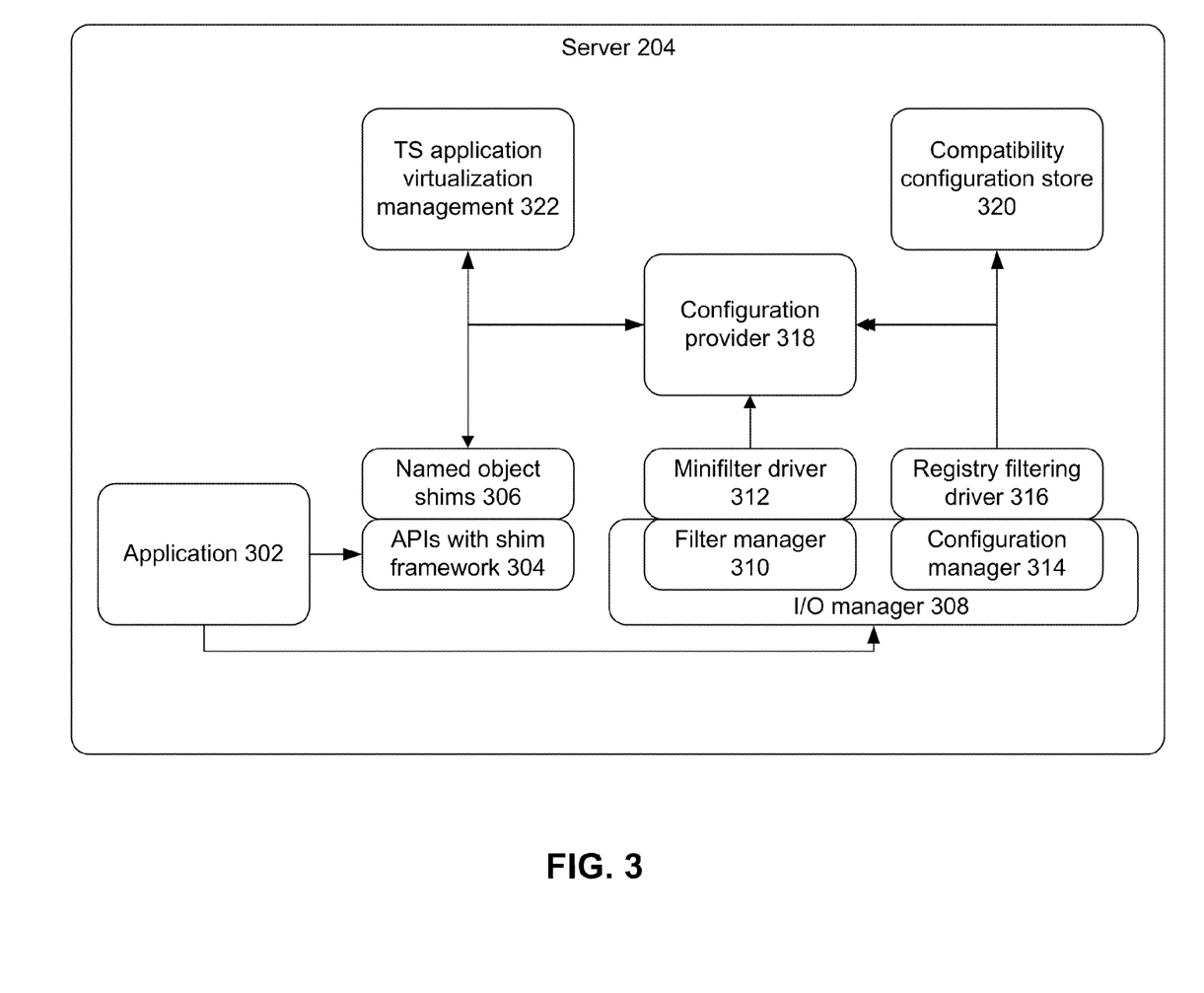
FIG. 3 illustrates an example of a terminal server architecture operable to provide a virtual single-user session to a client.

Referring now to FIGS. 2 and 3, they generally illustrate example environments wherein aspects of the present disclosure can be implemented. One skilled in the art can appreciate that the example elements depicted by FIGS. 2 and 3 are illustrated to provide an operational framework for describing the present disclosure. Accordingly, in some embodiments the physical layout of each environment may be different depending on different implementation schemes. Thus the example operational framework is to be treated as illustrative only and in no way limit the scope of the claims. One skilled in the art can also appreciate that the following discussion is introductory and the elements depicted by FIGS. 2 and 3 are described in more detail within the discussion of the operational procedures depicted by FIG. 4.

Generally, FIG. 2 depicts a high level overview of a server environment that can be configured to include aspects of the present disclosure. In reference to the figure, depicted is a server 204 that can include circuitry configured to effectuate a terminal server, or in other embodiments the server 204 can include circuitry configured to support remote desktop connections. In the depicted example, the server 204 can be configured to generate one or more sessions for connecting clients such as sessions 1 through N (where N is an integer greater than 2). Briefly, a session in example embodiments of the present disclosure can generally include an operational environment that is effectuated by a plurality of subsystems, e.g., software code, that are configured to interact with a kernel 214 of server 204. For example, a session can include a process that instantiates a user interface such as a desktop window, the subsystems that track mouse movement within the window, the subsystems that translate a mouse click on an icon into commands that effectuate an instance of a program, etc. A session can be generated by the server 204 on a user by user basis by the server 204 when, for example, the server 204 receives a connection request over a network connection from a client 201. Generally, a connection request can first be handled by the transport logic 210 that can, for example, be effectuated by circuitry of the server 204. The transport logic 210 can in some embodiments include a network adaptor; firmware, and software that can be configured to receive connection messages and forward them to the engine 212. As illustrated by FIG. 2, the transport logic 210 can in some embodiments include protocol stack instances for each session. Generally, each protocol stack instance can be configured to route user interface output to a client and route user input received from the client to the session core 244 associated with its session.

Continuing with the general description of FIG. 2, the engine 212 in some example embodiments of the present disclosure can be configured to process requests for sessions; determine the functionality for each session; generate sessions by allocating a set of physical resources for the session; and instantiating a protocol stack instance for the session. In some embodiments the engine 212 can be effectuated by specialized circuitry components that can implement some of the above mentioned operational procedures. For example, the circuitry in some example embodiments can include memory and a processor that is configured to execute code that effectuates the engine 212. As depicted by FIG. 2, in some instances the engine 212 can receive connection requests and determine that, for example, a license is available and a session can be generated for the request. In the situation where the server 204 is a remote computer that includes remote desktop capabilities, the engine 212 can be configured to generate a session in response to a connection request without checking for a license. As illustrated by FIG. 2, a session manager 216 can be configured to receive a message from an engine 212 and in response to the message the session manager 216 can add a session identifier to a table; assign memory to the session identifier; and generate system environment variables and instances of subsystem processes in memory assigned to the session identifier.

As illustrated by FIG. 2, the session manager 216 can instantiate environment subsystems such as a runtime subsystem 240 that can include a kernel mode part such as the session core 244. For example, the environment subsystems in an embodiment are configured to expose some subset of services to application programs and provide an access point to the kernel of the operating system 214. In example embodiments the runtime subsystem 240 can control the execution of processes and threads and the session core 244 can send requests to the executive of the kernel 214 to allocate memory for the threads and schedule time for them to be executed. In an embodiment the session core 244 can include a graphics display interface 246 (GDI), a security subsystem 250, and an input subsystem 252. The input subsystem 252 can in these embodiments be configured to receive user input from a client 201 via the protocol stack instance associated with the session and transmit the input to the session core 244 for the appropriate session. The user input can in some embodiments include signals indicative of absolute and/or relative mouse movement commands, mouse coordinates, mouse clicks, keyboard signals, joystick movement signals, etc. User input, for example, a mouse double-click on an icon, can be received by the session core 244 and the input subsystem 252 can be configured to determine that an icon is located at the coordinates associated with the double-click. The input subsystem 252 can then be configured to send a notification to the runtime subsystem 240 that can execute a process for the application associated with the icon.

In addition to receiving input from a client 201, draw commands can be received from applications and/or a desktop and be processed by the GDI 246. The GDI 246 in general can include a process that can generate graphical object draw commands. The GDI 246 in this example embodiment can be configured to pass its output to the remote display subsystem 254 where the commands are formatted for the display driver that is attached to the session. In certain example embodiments one or more physical displays can be attached to the server 204, e.g., in a remote desktop situation. In these example embodiments the remote display subsystem 254 can be configured to mirror the draw commands that are rendered by the display driver(s) of the remote computer system and transmit the mirrored information to the client 201 via a stack instance associated with the session. In another example embodiment, where the server 204 is a terminal server, the remote display subsystem 254 can be configured to include virtual display driver(s) that may not be associated with displays physically attacked to the server 204, e.g., the server 204 could be running headless. The remote display subsystem 254 in this embodiment can be configured to receive draw commands for one or more virtual displays and transmit them to the client 201 via a stack instance associated with the session. In an embodiment of the present disclosure, the remote display subsystem 254 can be configured to determine the display resolution for each display driver, e.g., determine the display resolution of the virtual display driver(s) associated with virtual displays or the display resolution of the display drivers associated with physical displays; and route the packets to the client 201 via the associated protocol stack instance.

In some example embodiments the session manager 216 can additionally instantiate an instance of a logon process associated with the session identifier of the session that can be configured to handle logon and logoff for the session. In these example embodiments drawing commands indicative of the graphical user interface associated with the logon process can be transmitted to the client 201 where a user of the client 201 can input an account identifier, e.g., a username/password combination, a smart card identifier, and/or biometric information into a logon screen. The information can be transmitted to server 204 and routed to the engine 212 and the security subsystem 250 of the session core 244. For example, in certain example embodiments the engine 212 can be configured to determine whether the user account is associated with a license; and the security subsystem 250 can be configured to generate a security token for the session.

FIG. 3 illustrates an example of a terminal server architecture operable to provide a virtual single-user session to a client. The primary embodiment described is of a MICROSOFT WINDOWS™ operating system architecture, in which the terminal server comprises REMOTE DESKTOP SESSION HOST™, and the terminal server session comprises a REMOTE DESKTOP SERVICES™ session. It may be appreciated that these techniques may be applied to other operating system architectures, insomuch as that they use application programming interfaces (APIs) and drivers to handle requests of file system, named object and other resources.

The depicted terminal server uses filter drivers and application programming interface (API) shims to create a virtualized system (including file system, registry, and named objects) that is driven by a configuration layer. In an embodiment, where a resource is said to be virtualized, that may be thought of as a "virtualized" resource in a user-space unique to the end user of the terminal server session that corresponds to the requested resource in system-space, such that requests to the system-space resource are transparently directed to the user-space resource. The filter drivers query the configuration layer for paths to redirect to the virtual system (the virtual system comprises a call to user-space corresponding to the intended call to system-space, such that each user has a separate user-space corresponding to his terminal server session) and the configuration layer uses a user-driven configuration of virtualization depending on the application being used.

When a client in a terminal server session with terminal server 300 executes application 302 (herein, where a client is said to execute a process hosted on terminal server 300, it shall be meant that the client issues an instruction for the process to be executed and terminal server 300 executes the process and sends output from the process to the client), a unique instance of application 302 is executed for the client. That is, if another client is also executing application 302, each client executes a separate instance of application 302. As the client sends input to the application that cause the application to request resources of terminal server 300, those requests are sent to WINDOWS™ APIs with shim framework 304 (where the resource comprises a named object) and input/output (I/O) manager 308 (where the resource comprises a file system or a registry). In an embodiment where terminal server architecture of FIG. 3 is developed in the server environment of FIG. 2, I/O manager 308 is part of I/O subsystem 252.

Where the resource comprises a named object, application 302 directs the request to WINDOWS™ APIs with shim framework 304. A shim comprises a (typically small) library that transparently intercepts an API call, changes the parameters passed, handles the operation itself, or redirects the operation elsewhere. A named object comprises a mutex, semaphore, event, or timer object, and a corresponding name, such that processes may use the name to access or otherwise process the corresponding object. Shim 306 intercepts the request received by WINDOWS™ with shim framework 306, and redirects the request to the appropriate venue. For instance, where the request comprises the creation of a named object in system-space, this may comprise creating a corresponding object in the user's user-space, that may be considered a "virtual" version of the object in system-space.

Where the resource comprises a file system resource or a registry resource, application 302 directs the request to I/O manager 308. Where the resource comprises a file system resource, the request is received at I/O manager 308 by filter manager 310. Filter manager 310 comprises a file system filter driver that is inserted into terminal server's 300 driver stack to manage the execution of one or more filter drivers (or minifilters), such as file system minifilter driver 312. The combination of filter manager 310 and minifilter driver 312 intercepts a request to a registry resource via callbacks, and modifies the request to the files system of terminal server 300. This modification may comprise file read or write redirection to implement file virtualization.

Where the resource comprises a registry resource (in the WINDOWS™ operating system, the registry comprises a database that stores settings and options for the operating system. It may contain information and setting for hardware, operating system software, some or all non-operating system software, and user-specific settings) the request is received at I/O manager 308 by configuration manager 314. Registry filtering driver 316 interfaces with configuration manager 314 similar to how minifilter driver 312 interfaces with filter manager 310 to intercept and modify the request to the registry resource through a read or write operation to virtualize the registry of terminal server 300.

Whether processed by named object shims 306, minifilter driver 312, or registry filtering driver 316, that component queries configuration provider 318 to determine the virtualization policy of an application. For instance, the component may query configuration provider 318 with the name of application 302, and receive in return application's 302 virtualization policy. In an embodiment, configuration provider 318 comprises an API for such queries. In an embodiment, configuration provider 312 loads configuration information of one or more installed applications when terminal server 300 boots up and updates its cache based on triggers due to events such as the installation of a new application.

Configuration provider 318 determines the reply to such queries by accessing compatibility configuration store 320. Configuration store 320 comprises a repository, such as a database, that stores the rules for virtualization. It may contain a set of global policies (such as "do not virtualize all applications"), a list of applications (including version information and a checksum signature, such as a md5 signature) to virtualize, and any defined exclusion or inclusion paths for each application.

Configuration provider 318 and compatibility configuration store 320 may be modified through use of TS application virtualization management 322. TS application virtualization management 322 comprises an administrative tool with exposed APIs and a user interface that allows a user, such as an administrator, to modify virtualization policies, add an application to compatibility configuration store 320, and specify exclusion of a file, folder, or registry from virtualization.

An application may be provided a partial virtual single-user session for an application, where some but not all resources are virtualized (including partial virtualization of a resource), or a complete virtual single-user session for an application. For instance, a text editor application may write template files to C:\Data and edited text files to C:\Windows. It may be that there is a low chance of two user's templates having the same name, or that it is desirable for users to be able to see each other's templates. However, it may be that it there is a high chance of two user's text files having the same name, or that it is undesirable for users to be able to see each other's templates. In such a case, the file system resource for C:\Windows may be left un-virtualized, while the file system resource for C:\Data may be virtualized.

In an embodiment, virtualized file system resources may be stored in a user profile of the user, and compatibility configuration store 320 maintains a correlation between the where the virtualized file system resource appears to the user to be located, and its location in the user profile, such that where the user attempts to access the file where he believes it to be located, it is presented to him there as if it were there.

Figure 4:
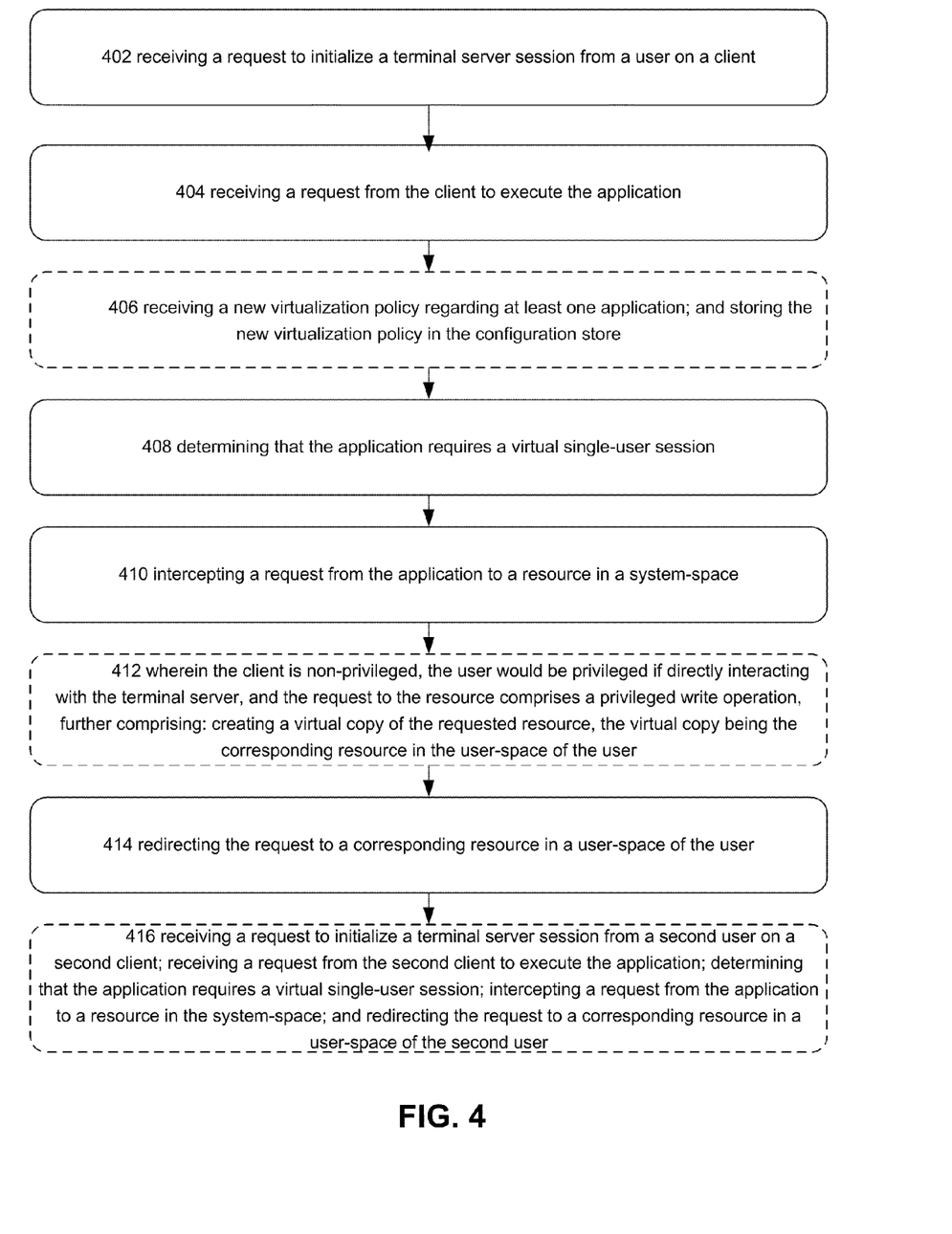
FIG. 4 illustrates example operating procedures for providing a virtual single-user session to a client in a terminal server session.

FIG. 4 illustrates example operating procedures for providing a virtual single-user session to a client in a terminal server session.

Operation 402 depicts initializing a terminal server session from a user on a client. In an embodiment, operation 402 takes place upon the user executing a terminal client application on his client computer, which then requests that a terminal server session be initialized across a communications network.

Operation 404 depicts receiving a request from the client to execute the application. In an embodiment, this occurs where the client is presented with a desktop display across the terminal server session and double-clicks on the application's icon.

Optional operation 406 depicts receiving a new virtualization policy regarding at least one application; and storing the new virtualization policy in a configuration store. In an embodiment, the configuration store comprises a database stored in memory.

In an embodiment, the new virtualization policy comprises one of a global policy, an application to provide a virtual single-user session, an application to cease providing a virtual single-user session, an exclusion path of an application to provide a virtual single-user session, and an inclusion path of an application to provide a virtual single-user session.

A global policy may comprise a policy to implement for all applications executed on a server, or for all terminal server sessions conducted by the server.

An application to provide a virtual single-user session may comprise the name of the application, the version(s) of the application, a checksum of the application (such as a md5 checksum), and a path in the file system where the application is or may be located.

An inclusion or exclusion path of an application may comprise a path in the file system where the application is or may be located. Where this is an inclusion path, it may be determined that all applications in that path, or in that path that meet certain criteria are to be provided a virtual single-user session. Where this is an exclusion path, it may be determined that all applications in that path, or in that path that meet certain criteria are not to be provided a virtual single-user session.

Operation 408 depicts determining that the application requires a virtual single-user session. In an embodiment, this comprises determining from the configuration store to provide the application a virtual single-user session. This may be effectuated, for example, by querying the configuration store with the name, path, or other identifying information of the application, and receiving in return an indication of whether or not the queried application is to be provided a virtual single-user session.

Operation 410 depicts intercepting a request from the application to a resource in a system-space.

In an embodiment, the request for the resource in the system-space is directed to a driver, and the request is intercepted by a resource virtualization driver. This may comprise, for example, a request to read or write a portion of a file system read or a registry.

In an embodiment, the request for the resource in the system space comprises an application programming interface (API) call to a create, access or modify a named object, and the request is intercepted by an API shim.

Optional operation 412 depicts, wherein the client is non-privileged, the user would be privileged if directly interacting with the terminal server, and the request to the resource comprises a privileged write operation, further comprising: creating a virtual copy of the requested resource, the virtual copy being the corresponding resource in the user-space of the user.

Operation 414 depicts redirecting the request to a corresponding resource in a user-space of the user. In an embodiment, this comprises modifying the request. For example, where the request is to a file and includes the path in the file system of the file, the request may be modified by substituting the path of the file with the path of the virtualized file located in user-space.

Optional operation 416 depicts receiving a request to initialize a terminal server session from a second user on a second client; receiving a request from the second client to execute the application; determining that the application requires a virtual single-user session; intercepting a request from the application to a resource in the system-space; and redirecting the request to a corresponding resource in a user-space of the second user

CONCLUSION

While the present disclosure has been described in connection with the preferred aspects, as illustrated in the various figures, it is understood that other similar aspects may be used or modifications and additions may be made to the described aspects for performing the same function of the present disclosure without deviating therefrom. Therefore, the present disclosure should not be limited to any single aspect, but rather construed in breadth and scope in accordance with the appended claims. For example, the various procedures described herein may be implemented with hardware or software, or a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed:

1. A method for executing an application with a virtual single-user session, comprising:
    initializing a remote presentation session for a first user account within an operating system instance of a multi-user server, the remote presentation session for the first user account being conducted with a client computer;
    receiving a request from the client computer to execute the application in the remote presentation session for the first user account;
    determining whether the application requires a first virtual single-user session with the multi-user server;
    in response to a determination that the application requires the first virtual single-user session with the multi-user server, intercepting a request from the application to a server resource, the server resource being located in a first portion of a memory in which system processes of the operating system instance execute;
    redirecting the request to a resource corresponding to the requested server resource, the resource located in a second portion of the memory in which user processes of the first user account execute;
    receiving a request from the client computer to execute a second application in the remote presentation session for the first user account;
    determining whether the second application requires a second virtual single-user session with the multi-user server; and
    in response to a determination that the second application does not require the second virtual single-user session with the multi-user server, permitting a request from the second application to a second server resource that is located in the first portion of memory in which system processes of the operating system instance execute to access the second server resource.

2. The method of claim 1, wherein the request for the server resource in the first portion of the memory is directed to a driver, and the request is intercepted by a resource virtualization driver.

3. The method of claim 2, wherein the server resource comprises:
    a file system read request, a file system write request, a registry read request, or a registry write request.

4. The method of claim 1, wherein the request for the server resource in the first portion of the memory comprises an application programming interface (API) call to a create, access or modify a named object, and the request is intercepted by an API shim.

5. The method of claim 1, wherein determining that the application requires the virtual single-user session comprises:
   determining from a configuration store to provide the application a virtual single-user session.

6. The method of claim 5, further comprising:
   receiving a new virtualization policy regarding at least one application; and
   storing the new virtualization policy in the configuration store.

7. The method of claim 6, wherein a new virtualization policy comprises:
   a global policy, an application to provide a virtual single-user session, an application to cease providing a virtual single-user session, an exclusion path of an application to provide a virtual single-user session, or an inclusion path of an application to provide a virtual single-user session.

8. The method of claim 1, wherein the client is non-privileged, the user would be privileged if directly interacting with the multi-user server, and the request to the server resource comprises a privileged write operation, further comprising:
   creating a virtual copy of the requested server resource, the virtual copy being the corresponding resource in the second portion of the memory.

9. The method of claim 1, further comprising:
   receiving a request to initialize a terminal server session from a second user on a second client;
   receiving a request from the second client to execute the application;
   determining that the application requires a virtual single-user session;
   intercepting a request from the application to a server resource in the first portion of the memory; and
   redirecting the request to a resource located in a third portion of the memory in which user processes of the second user account execute that corresponds to the resource located in the first portion of the memory.

10. The method of claim 1, wherein determining that the application requires a virtual single-user session, includes:
    determining that the application is to use a virtual single-user session for at least one resource.

11. A system for executing an application with a virtual single-user session, comprising:
    a processor; and
    a memory communicatively coupled to the processor when the system is operational, the memory bearing processor-executable instructions that, when executed on the processor, cause the system at least to:
      initialize a remote presentation session for a first user account within an operating system instance of a multi-user server, the remote presentation session for the first user account being conducted with a client computer;
      receive a request from the client computer to execute the application in the remote presentation session for the first user account;
      determine whether the application requires a first virtual single-user session with the multi-user server;
      in response to a determination that the application requires the first virtual single-user session with the multi-user server, intercept a request from the application to a server resource, the server resource being located in a first portion of the memory or another memory in which system processes of the operating system instance execute;
      redirect the request to a resource in second portion of the memory or another memory in which user processes of the first user account execute that corresponds to the requested server resource in the first portion; and
      receive a request from the client computer to execute a second application in the remote presentation session for the first user account;
      determine whether the second application requires a second virtual single-user session with the multi-user server; and
      in response to a determination that the second application does not require a virtual single-user session with the multi-user server, permit a request from the second application to a second server resource that is located in the first portion of memory in which system processes of the operating system instance execute to access the second server resource.

12. The system of claim 11, wherein the request for the server resource in first portion is directed to a driver, and the request is intercepted by a resource virtualization driver.

13. The system of claim 12, wherein the server resource comprises:
    a file system read request, a file system write request, a registry read request, or a registry write request.

14. The system of claim 11, wherein the request for the server resource in the first portion comprises an application programming interface (API) call to a create, access or modify a named object, and the request is intercepted by an API shim.

15. The system of claim 11, wherein the instructions that, when executed on the processor cause the system to at least determine that the application requires the virtual single-user session further cause the system at least to:
    determine from a configuration store to provide the application a virtual single-user session.

16. The system of claim 15, wherein the memory further bears processor-executable instructions that, when executed on the processor, cause the system at least to:
    receive a new virtualization policy regarding at least one application; and
    store the new virtualization policy in the configuration store.

17. The system of claim 16, wherein a new virtualization policy comprises:
    a global policy, an application to provide a virtual single-user session, an application to cease providing a virtual single-user session, an exclusion path of an application to provide a virtual single-user session, or an inclusion path of an application to provide a virtual single-user session.

18. The system of claim 11, wherein the client is non-privileged, the user would be privileged if directly interacting with the multi-user server, and the request to the server resource comprises a privileged write operation, wherein the memory further bears processor-executable instructions that, when executed on the processor, cause the system at least to:
    create a virtual copy of the requested server resource, the virtual copy being the corresponding resource in the second portion.

19. The system of claim 11, wherein the memory further bears processor-executable instructions that, when executed on the processor, cause the system at least to:

receive a request from a second client computer to execute the application, the second client computer corresponding to the remote presentation session for the second user account;
determine that the application requires a virtual single-user session;
intercept a request from the application to a server resource in the first portion; and
redirect the request to a corresponding resource in a third portion of the memory in which user processes of the second user account execute.

20. A machine-readable storage device, excluding signals, for executing an application with a virtual single-user session bearing instructions that, when executed on a processor, cause the processor to perform operations comprising:
initializing a remote presentation session for a first user account within an operating system instance of a multi-user server, the remote presentation session for the first user account being conducted with a client computer;
receiving a request from the client computer to execute the application in the remote presentation session for the first user account;
determining whether the application requires a first virtual single-user session with the multi-user server;
intercepting a request from the application to a server resource, the server resource being located in a first portion of a memory in which system processes of the operating system instance execute;
in response to a determination that the application requires the first virtual single-user session with the multi-user server, redirecting the request to a resource located in a second portion of the memory in which user processes of the first user account execute that corresponds to the requested server resource located in the first portion of the memory;
receiving a request from the client computer to execute a second application in the remote presentation session for the first user account;
determining whether the second application requires a second virtual single-user session with the multi-user server; and
in response to a determination that the second application does not require a virtual single-user session with the multi-user server, permitting a request from the second application to a second server resource that is located in the first portion of memory in which system processes of the operating system instance execute to access the second server resource.

* * * * *